United States Patent
Chino et al.

(10) Patent No.: US 7,698,035 B2
(45) Date of Patent: Apr. 13, 2010

(54) STEERING CONTROL APPARATUS

(75) Inventors: Naotaka Chino, Kanagawa (JP); Taku Suzuki, Kanagawa (JP); Noriki Kubokawa, Kanagawa (JP); Takaaki Eguchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 301 days.

(21) Appl. No.: 11/364,473

(22) Filed: Feb. 28, 2006

(65) Prior Publication Data

US 2006/0200290 A1    Sep. 7, 2006

(30) Foreign Application Priority Data

Mar. 1, 2005    (JP) ............................. 2005-056514

(51) Int. Cl.
   *B62D 6/00*    (2006.01)
   *B62D 5/065*    (2006.01)

(52) U.S. Cl. .............................. 701/41; 701/36; 180/204; 180/6.2; 180/6.44; 180/6.62; 180/405; 180/419; 74/388 R; 280/5.51

(58) Field of Classification Search ......... 180/402–407, 180/204, 6.2–6.7, 11, 12, 400, 40, 410, 417–447, 180/773–775, 93; 701/41–44, 1, 22, 29, 701/36; 475/18, 19; 73/117.02; 74/388; 116/28, 31
See application file for complete search history.

(56) References Cited

U.S. PATENT DOCUMENTS

| | | | | |
|---|---|---|---|---|
| 3,939,938 | A * | 2/1976 | Inoue | 180/422 |
| 4,745,984 | A * | 5/1988 | Shimizu | 180/446 |
| 4,771,846 | A * | 9/1988 | Venable et al. | 180/422 |
| 5,072,803 | A * | 12/1991 | Kilian et al. | 180/422 |
| 5,247,441 | A * | 9/1993 | Serizawa et al. | 701/41 |
| 6,041,882 | A * | 3/2000 | Bohner et al. | 180/402 |
| 6,062,336 | A * | 5/2000 | Amberkar et al. | 180/443 |
| 6,079,513 | A * | 6/2000 | Nishizaki et al. | 180/402 |
| 6,213,246 | B1 * | 4/2001 | Bohner et al. | 180/403 |
| 6,269,903 | B1 * | 8/2001 | Bohner et al. | 180/406 |
| 6,283,243 | B1 * | 9/2001 | Bohner et al. | 180/406 |
| 6,285,936 | B1 * | 9/2001 | Bohner et al. | 701/41 |
| 6,442,462 | B1 * | 8/2002 | Nishizaki et al. | 701/41 |
| 6,481,526 | B1 * | 11/2002 | Millsap et al. | 180/402 |

(Continued)

FOREIGN PATENT DOCUMENTS

| | | |
|---|---|---|
| EP | 1 407 959 A2 | 4/2004 |
| EP | 1 533 211 A2 | 5/2005 |
| JP | 2002087308 | 3/2002 |

OTHER PUBLICATIONS

English Abract of JP2002087308.
European Patent Search No. 06251120.9-2425 dated Jun. 19, 2006.

*Primary Examiner*—Jack W. Keith
*Assistant Examiner*—Jonathan M Dager
(74) *Attorney, Agent, or Firm*—Young Basile

(57) ABSTRACT

A steering control apparatus is provided, including a steering wheel, steered wheels, a direction varying actuator to operate the steering control wheels, a steering reaction actuator to apply steering reaction torque to the steering wheel and steering controller. The steered wheels are mechanically disconnected from the steering wheel. The steering controller outputs control commands for controlling the direction varying actuator and the steering reaction actuator.

20 Claims, 11 Drawing Sheets

U.S. PATENT DOCUMENTS

| | | | |
|---|---|---|---|
| 6,527,079 B2* | 3/2003 | Takeuchi et al. | 180/443 |
| 6,554,095 B2* | 4/2003 | Zheng et al. | 180/402 |
| 6,557,662 B1* | 5/2003 | Andonian et al. | 180/402 |
| 6,580,989 B1* | 6/2003 | Husain et al. | 701/41 |
| 6,681,166 B2* | 1/2004 | Kato et al. | 701/41 |
| 6,799,654 B2* | 10/2004 | Menjak et al. | 180/402 |
| 6,929,086 B1* | 8/2005 | Husain et al. | 180/413 |
| 6,934,614 B2* | 8/2005 | Yamamura et al. | 701/45 |
| 7,004,279 B2* | 2/2006 | Shitamitsu et al. | 180/402 |
| 7,375,481 B2* | 5/2008 | Kasbarian et al. | 318/254.1 |
| 2002/0092696 A1* | 7/2002 | Bohner et al. | 180/405 |
| 2002/0125063 A1* | 9/2002 | Kurishige et al. | 180/443 |
| 2002/0157894 A1* | 10/2002 | Hjelsand et al. | 180/446 |
| 2003/0019685 A1* | 1/2003 | Graber et al. | 180/402 |
| 2003/0060950 A1* | 3/2003 | McKeown et al. | 701/29 |
| 2003/0114969 A1* | 6/2003 | Dominke et al. | 701/41 |
| 2004/0079578 A1* | 4/2004 | Kurishige et al. | 180/446 |
| 2004/0104066 A1* | 6/2004 | Sakai | 180/402 |
| 2004/0211618 A1* | 10/2004 | Ogawa et al. | 180/402 |
| 2004/0262071 A1* | 12/2004 | Duits et al. | 180/402 |
| 2005/0045413 A1* | 3/2005 | Shitamitsu et al. | 180/402 |
| 2005/0071061 A1* | 3/2005 | Kato et al. | 701/41 |
| 2005/0072621 A1* | 4/2005 | Hara et al. | 180/444 |
| 2005/0082106 A1 | 4/2005 | Husain et al. | |
| 2005/0082108 A1* | 4/2005 | Husain | 180/402 |
| 2005/0087386 A1* | 4/2005 | Hennemann et al. | 180/418 |
| 2005/0149241 A1* | 7/2005 | Fujioka et al. | 701/41 |

* cited by examiner

Vehicle Behavior Gain of End Contact Reaction - Torque Correction Value

Vehicle Speed Gain of End Contact Reaction - Torque Correction Value

Motor Temperature Gain of End Contact Reaction - Torque Correction Value

Related Art: End Contact Reaction Torque

Embodiment: End Contact Reaction Torque

STEERING CONTROL APPARATUS

RELATED APPLICATION

The disclosure of Japanese Patent Application No. 2005-056514, filed Mar. 1, 2005, including its specification, claims and drawings is incorporated herein by reference in its entirety.

FIELD

Described herein is a steering controller employing a steer-by-wire system in which a steering unit having a steering wheel and a steering reaction actuator and a direction varying unit having steered wheels and a direction varying actuator are mechanically disconnected from each other.

BACKGROUND

In recent years, there has been suggested a vehicle steering controller employing a so-called steer-by-wire (hereinafter referred to as "SBW") system in which a mechanical connection between a steering wheel and steered wheels is released and a part of a steering system comprises an electrical path. Since such a SBW system does not have a mechanical connection between the steering wheel and the steered wheels, it is necessary to perform a control process for providing a driver with a contact feeling through the steering wheel; for example, when the steering wheel is turned and the turning limit is reached. Accordingly, it has been suggested to provide the driver with a mechanical contact feeling by generating the maximum reaction force in the steering reaction actuator, when deviation between a target direction varying angle and an actual direction varying angle is greater than or equal to a predetermined value. See, for example, Japanese Unexamined Patent Application Publication No. 2002-87308.

SUMMARY

In a general steering system in which the steering unit and the direction varying unit are always mechanically connected to each other through a steering column shaft or the like, the steering wheel can be operated more after the steering wheel angle reaches the limit at a rack stopper angle θmax due to reaching the rack stopper, because elastic deformation or flexure of the steering column shaft or the like absorb the additional steering operation somewhat. However, in a conventional steering controller, the control for abruptly generating the maximum reaction force by the use of the steering reaction actuator is performed when the deviation is greater than or equal to a predetermined value. Accordingly, this reaction force may give a driver a somewhat uncomfortable contact feeling.

The present steering controller provides a driver with an excellent contact feeling through a steering wheel by use of a reaction actuator when the driver turns the steering wheel in a steer-by-wire control process.

Where a steering unit having a steering wheel and a steering reaction actuator and a direction varying unit having steered wheels and a direction varying actuator are mechanically disconnected from each other, the present steering controller provides a direction varying torque control means for transmitting a control command to the direction varying actuator for applying a direction varying torque to the direction varying unit in accordance with the steering status of the steering wheel.

Also provided is a steering reaction control means for transmitting a control command to the steering reaction actuator for applying a steering reaction torque to the steering unit in accordance with the direction varying status of the steered wheels.

When a direction varying angle of the steered wheels reaches the vicinity of the maximum direction varying angle, the control means gradually increases the steering reaction torque with the lapse of time after the beginning of correction.

Accordingly, in the present steering controller, when the direction varying angle of the steered wheels reaches the vicinity of the maximum direction varying angle, the control means gradually increases the steering reaction torque with the lapse of time after the beginning of correction. That is, when the maximum reaction force that can prevent the steering wheel from moving under the manipulation force of a driver is abruptly generated, it is required that the steering reaction torque be increased instantaneously to a high value, thereby calling for increased size of the steering reaction actuator.

As a result, when the steering wheel is turned under steer-by-wire control, it is possible to provide the driver with an excellent end contact feeling through the steering wheel with the use of a small-sized steering reaction actuator that is advantageous in space and cost.

BRIEF DESCRIPTION OF THE DRAWINGS

These and other features and advantages of the present steering controller will be apparent from the ensuing description, taken in conjunction with the accompanying drawings, in which.

DETAILED DESCRIPTION OF THE ILLUSTRATED EMBODIMENT

Figure 1:
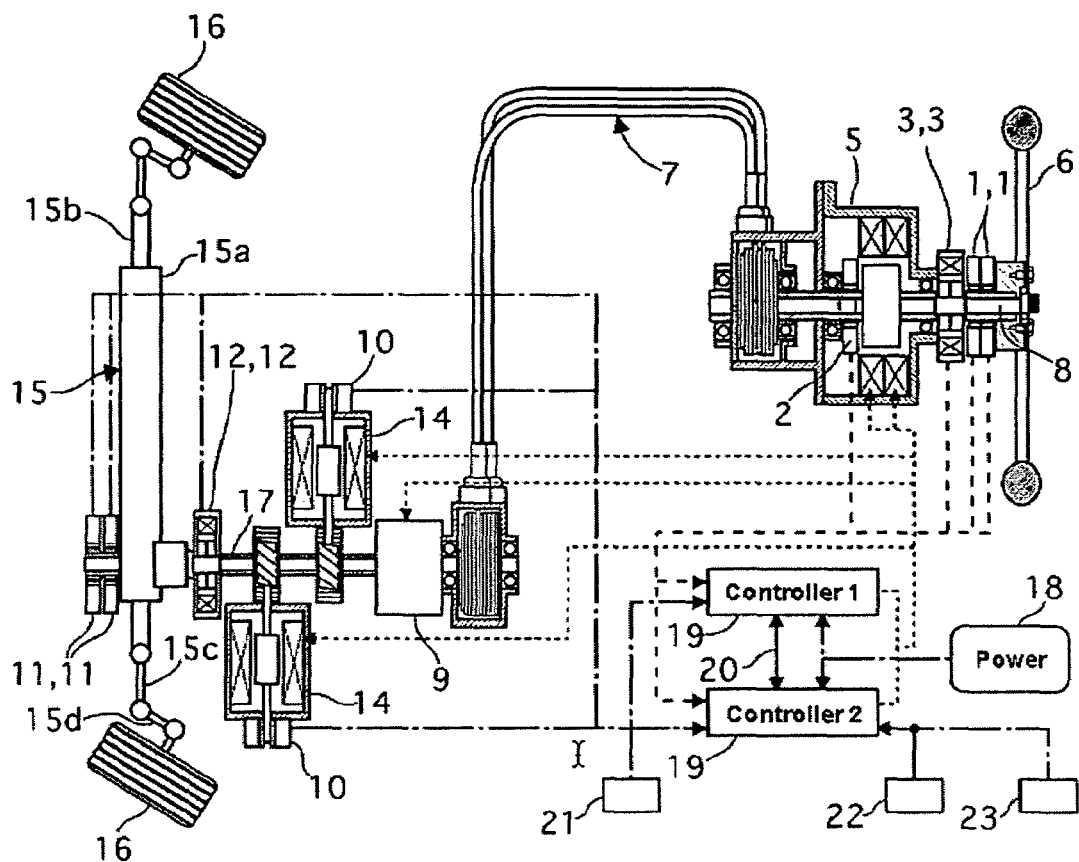
FIG. 1 is a diagrammatic representation of the configuration of a steer-by-wire system employing the present steering controller according to an embodiment thereof.
Figure 2:
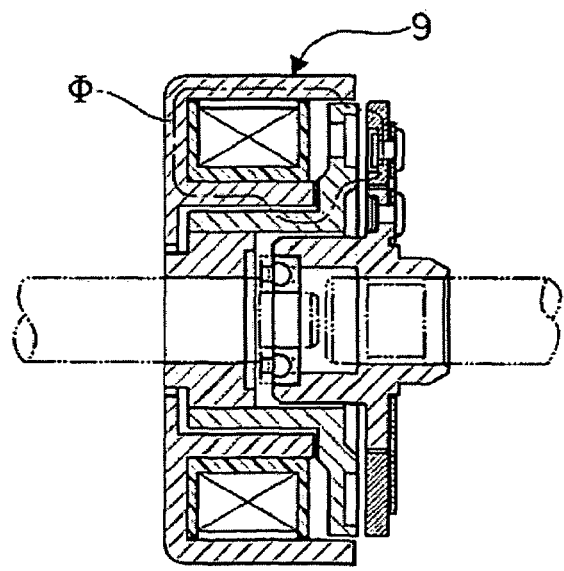
FIG. 2 is a cross-sectional view illustrating a positional example of a backup clutch of the steer-by-wire system of FIG. 1.
Figure 3:
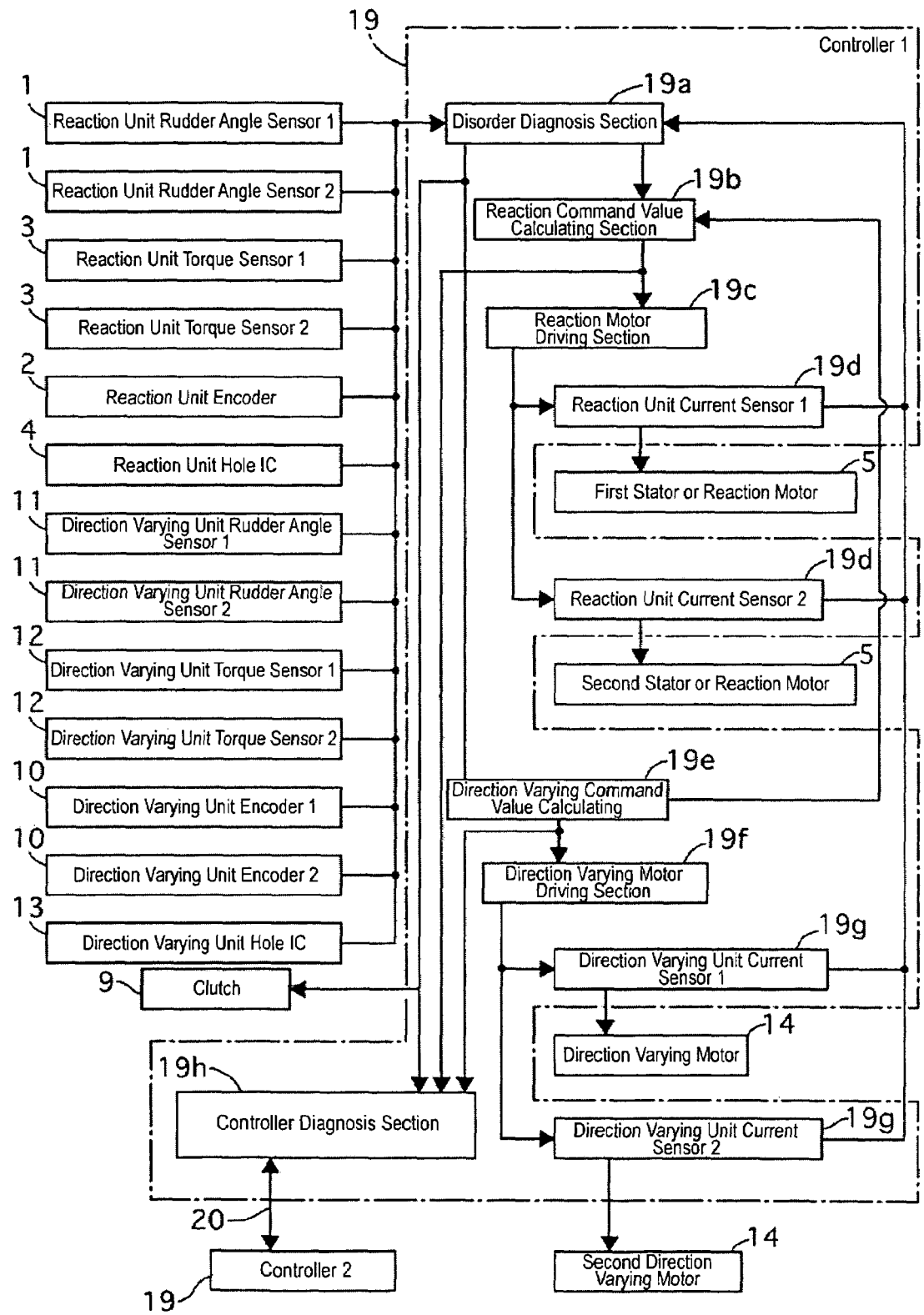
FIG. 3 is a block diagram illustrating a control configuration used for SBW control in accordance with the illustrated embodiment.

FIG. 1 is a diagrammatic representation of the configuration of a steer-by-wire system (hereinafter, referred to as "SBW system") employing a steering controller according to the illustrated embodiment, FIG. 2 is a cross-sectional view illustrating an example of a backup clutch in the steering controller of the illustrated embodiment, and FIG. 3 is a control block diagram illustrating the system of the steering controller according to the illustrated embodiment. The steering controller according to the illustrated embodiment includes a reaction unit (steering unit), a backup mechanism (backup means), a direction varying unit, and a controller.

The reaction unit includes rudder angle sensors 1,1, an encoder 2, torque sensors 3,3 (steering torque detecting means), a Hall IC 4, and a reaction motor 5 (steering reaction actuator).

The rudder angle sensors 1,1 comprise means for detecting a turning angle of the steering wheel 6, are disposed in a column shaft 8 for coupling a cable column 7 (to be described below) to the steering wheel 6, and have a double system having two torque sensors, namely a first rudder angle sensor and a second rudder angle sensor. That is, the rudder angle sensors 1,1 are disposed between the steering wheel 6 and the torque sensors 3,3 and are able to detect the steering angle without being affected by variation in angle due to torsion of the torque sensors 3,3. The rudder angle sensors 1,1 employ an absolute type resolver.

The torque sensors 3,3 are disposed between the rudder angle sensor 1 and the reaction motor 5 and have a double system of two torque sensors, namely a first torque sensor and a second torque sensor. The torque sensors 3,3 includes a torsion bar extending, for example, in the axial direction, a first axis which is connected to one end of the torsion bar on the same axis as the torsion bar, a second axis which is connected to the other end of the torsion bar on the same axis as the torsion bar and the first axis, a first magnetic member fixed to the first axis, a second magnetic member fixed to the second axis, a coil opposed to the first magnetic member and the second magnetic member, and a third magnetic member which surrounds the coil and forms a magnetic circuit together with the first magnetic member and the second magnetic member. The coil is changed in inductance in accordance with the relative displacement between the first magnetic member and the second magnetic member based on the torsion acting on the torsion bar and detects a torque from an output signal based on the variation in inductance.

The reaction motor 5 includes a steering reaction actuator for applying a reaction force to the steering wheel 6 and comprises an electric motor having one rotor and one stator having the column shaft 8 as its axis of rotation. A casing thereof is fixed to a vehicle body. A brushless motor is used as the reaction motor 5, and the encoder 2 and the Hall IC 4 are added due to use of the brushless motor. In this case, the driving of the motor to generate a motor torque is possible only by the use of the Hall IC 4, but a minute torque variation occurs and the steering reaction feeling is not good. Accordingly, in order to perform the more minute and smooth reaction control, by fitting the encoder 2 to the axis of the column shaft 8 and performing the motor control, the minute torque variation is reduced, thereby accomplishing the improvement of the steering reaction feeling. A resolver may be used instead of the encoder 2.

The backup mechanism, which can mechanically connect and disconnect the reaction unit and the direction varying unit to and from each other, includes a cable column 7 and a backup clutch 9.

The cable column 7 is a mechanical backup mechanism which bypasses a member interposed between the reaction unit and the direction varying unit for the purpose of avoiding interference therewith and performs a function as a column shaft for delivering a torque in a backup mode when the backup clutch 9 is coupled. The cable column 7 is constructed by winding two inner cables, ends of which are fixed to two reels, around each other in opposite directions and fixing both ends of an outer tube into which two inner cables are inserted in two reel cases.

The backup clutch 9 is disposed on the side of the direction varying unit and employs an electromagnetic clutch in the illustrated embodiment. A schematic section of the backup clutch 9 is shown in FIG. 2. The backup clutch 9 has both an electromagnetic clutch and a mechanical clutch and performs coupling with mechanical strength at the time of coupling the clutch, by giving initial sliding to a frictional plate due to the turning-on of an electromagnet and moving a cam of a mechanical coupling portion with the frictional plate. At the time of releasing the coupling, the backup clutch can release the coupling by turning off the electromagnet and moving the cam of the mechanical coupling portion to either of input and output sides. Then, by coupling the backup clutch 9, the torque from the reaction unit and the torque from the direction varying unit can be delivered through the cable column 7 and the backup clutch 9.

The direction varying unit includes encoders 10,10, rudder angle sensors 11,11, torque sensors 12,12, a Hall IC 13, direction varying motors 14,14 (direction varying actuator), a steering mechanism 15, and steered wheels 16,16.

The rudder angle sensors 11,11 and the torque sensors 12,12 are disposed on the axis of a pinion shaft 17 to which the backup clutch 9 is attached at one end and a pinion gear is formed on the other end. The rudder angle sensors 11,11 have a double system similar to the rudder angle sensors 1,1 and employ an absolute type resolver for detecting the number of revolutions of the shaft. The torque sensors 12,12 have a double system similar to the torque sensors 3,3 and employ a member for detecting torque from variation in inductance. By disposing the rudder angle sensors 11,11 upstream through the pinion gear and disposing the torque sensors 12,12 downstream, detection of the direction varying angle by the rudder angle sensors 11,11 is not affected by the variation in angle due to the torsion of the torque sensors 12,12.

The direction varying motors 14,14 are designed to apply the direction varying torque to the pinion shaft 17 at the time of driving a motor, by disposing a pinion motor engaged with a worm gear, which is disposed at an intermediate position between the backup clutch 9 on the pinion shaft 17 and the torque sensors 12,12, on a motor axis. The direction varying motors 14,14 have a double system and employ brushless motors comprising a first direction varying motor 14 and a second direction varying motor 14. Similarly to the reaction motor 5, the encoders 10,10 and the Hall IC 13 are added due to use of the brushless motor.

The steering mechanism 15 varies the directions of the left and right steered wheels 16,16 with rotation of the pinion shaft 17 and includes a rack shaft 11b, which is inserted into a rack tube 15a and in which a rack gear engaging with the pinion gear of the pinion shaft 17 is formed, tie rods 15c and 15c coupled to both ends of the rack shaft 15b extending in the lateral direction of the vehicle, and knuckle arms 11d and 15d of which one end is coupled to the tie rods 15c and 15c and the other end is coupled to the steered wheels 16,16.

The controller has a double system of two controllers 19,19 for performing operations with a power source 18.

As shown in FIG. 3, detected values are input to the controller 19 from the rudder angle sensors 1,1, the encoder 2, the torque sensors 3,3, and the Hall IC 4 of the reaction unit, and the encoders 10,10, the rudder angle sensors 11,11, the torque sensors 12,12, and the Hall IC 13 of the direction varying unit.

The controller 19 includes a disorder diagnosis section 19a for diagnosing disorders of the direction varying control and the reaction control in the SBW control process (steer-by-wire control process by means of decoupling of a clutch), a disorder of an EPS control process (electric power steering control process by means of coupling of the clutch), and for transfer control from the SBW control process to the EPS control process at the time of disorder diagnosis.

In addition to the disorder diagnosis section 19a, the controller 19 includes a reaction command value calculating section 19b, a reaction motor driving section 19c, a reaction unit current sensor 19d, a direction varying command value calculating section 19e, a direction varying motor driving section 19f, direction varying unit current sensors 19g and 19g, and a controller diagnosis section 19h. Controllers 19,19 are connected to each other through a bidirectional communication line 20.

Sensor information used in an "end contact control" process is input to both controllers 19,19 from a yaw rate/lateral G sensor 21 (vehicle behavior detecting means), a vehicle speed sensor 22 (vehicle speed detecting means), and a reaction motor temperature sensor 23 (temperature detecting means) for detecting a temperature of the reaction motor 5.

Figure 4:
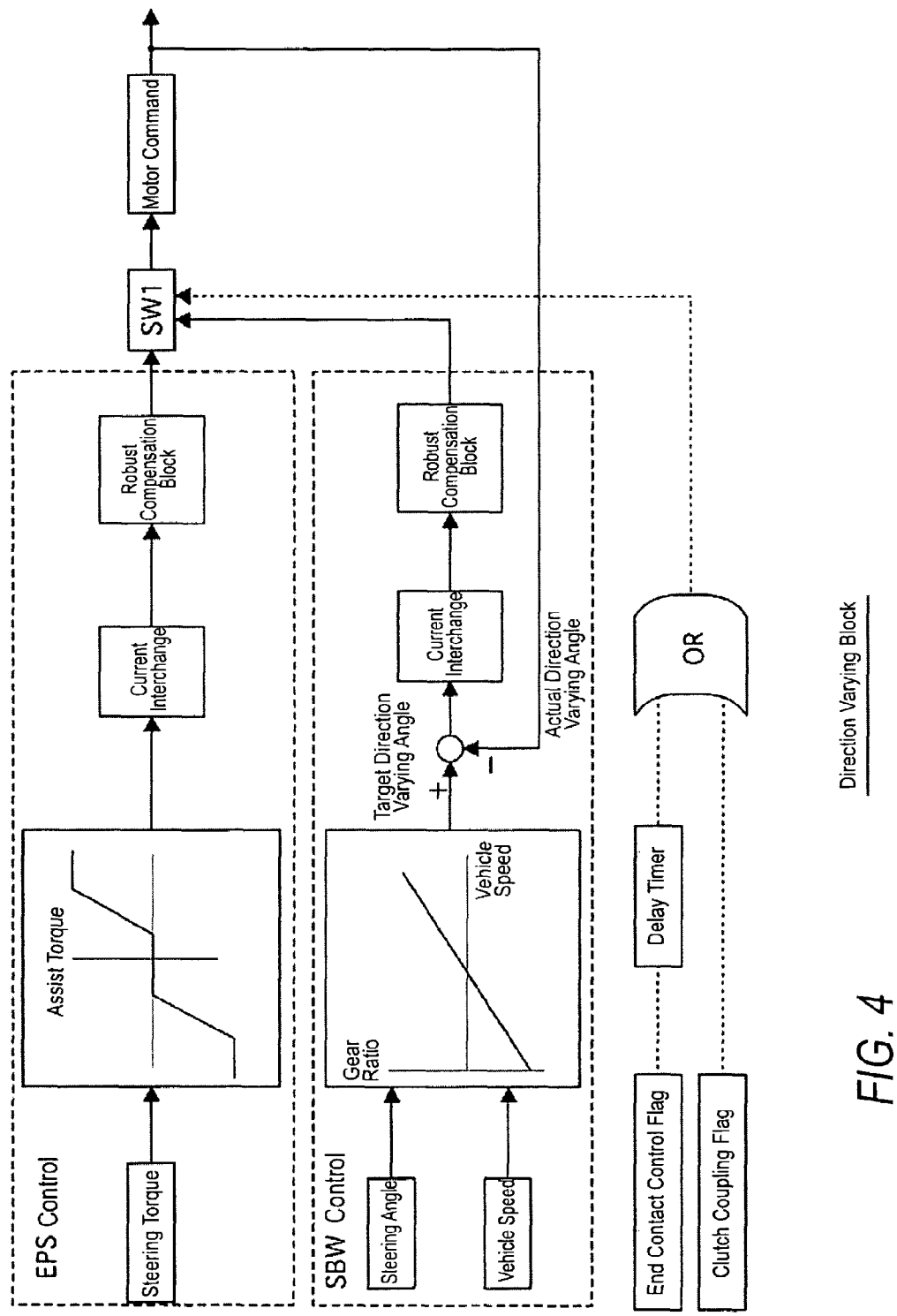
FIG. 4 is a block diagram illustrating direction varying control by the steering controller according to the illustrated embodiment.
Figure 5:
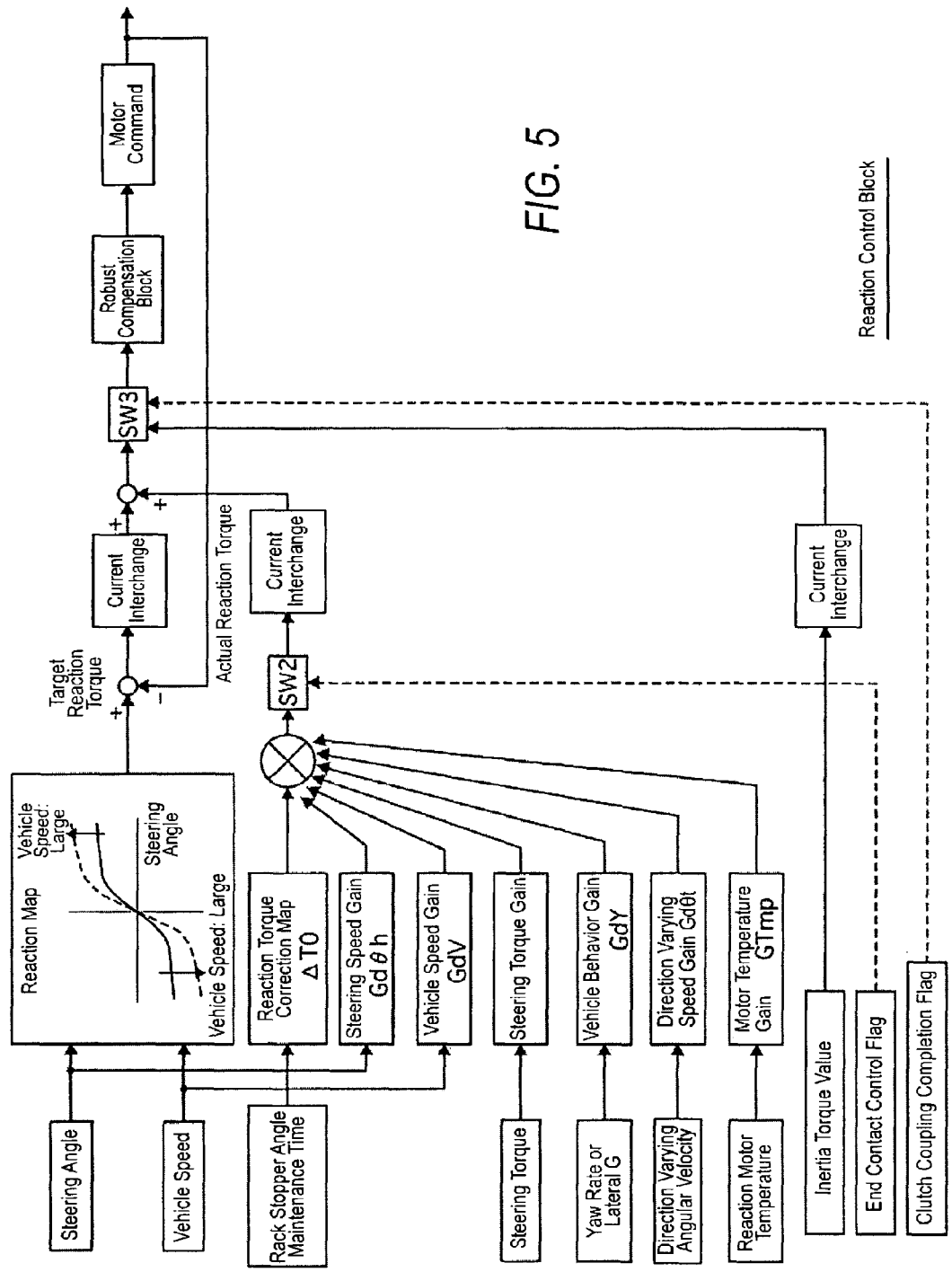
FIG. 5 is a block diagram illustrating reaction control by the steering controller according to the illustrated embodiment.

FIG. 4 is a diagram of direction varying control blocks (direction varying control means) illustrating the direction varying control by the controllers 19,19 of the steering controller according to the illustrated embodiment. FIG. 5 is a diagram of reaction control blocks (steering reaction control means) illustrating the reaction control by the controllers 19,19 of the steering controller according to the illustrated embodiment.

Now the "SBW control", the "EPS control", and the "end contact control" according to the illustrated embodiment will be described with reference to FIGS. 4 and 5.

In the direction varying control of the "SBW control" process, as shown in FIG. 4, a command current value is calculated from the deviation between a target direction varying angle obtained by multiplying the steering angle of the steering wheel 6 by a gear ratio set depending upon the vehicle speed and an actual direction varying angle obtained from the rotational angle of the direction varying motor 14, the command current value is converted into current, and then the direction varying motor 14 is driven by means of a command current obtained by performing robust compensation to the converted current.

In the reaction control of the "SBW control" process, as shown in FIG. 5, a target reaction torque (a torque corresponding to the direction varying status of the steered wheels 16,16) is set on the basis of the steering angle of the steering wheel 6, the vehicle speed, and a reaction chart, a command current value is calculated from the deviation between an actual reaction torque obtained from the torque sensor 3 and the target reaction torque, the command current value is converted into current, and then the reaction motor 5 is driven by means of the command current obtained by performing the robust compensation to the converted current.

In the "EPS control" process, as shown in FIG. 4, a steering assist torque is set on the basis of the steering torque input to the steering wheel 6 and an assist torque chart, the steering assist torque is converted into current, and then the direction varying motor 14 is driven by means of the command current obtained by performing the robust compensation to the converted current. At this time, by setting the command current of the reaction motor 5 to zero, the reaction motor is not driven. Alternatively, by dividing the steering assist torque, the steering reaction torque is generated in the same direction as the steering torque by the reaction motor 5. In the block diagram of the direction varying control shown in FIG. 4, a first switch SW1 performs the switching between the "SBW control" process and the "EPS control" process.

The "end contact control" process is performed, when the target direction varying angle generated from the steering angle reaches the vicinity of a rack stopper end contact angle, by outputting the coupling command of the backup clutch 9, calculating an end contact reaction-torque correcting reference value, which is added to the steering reaction torque, in accordance with the maintenance time after reaching the vicinity of the rack stopper end contact angle, adjusting the gain of the end contact reaction-torque correction value on the basis of traveling statuses (steering torque, steering angular velocity or direction varying angular velocity, vehicle behavior quantity, vehicle speed, motor temperature, and the like), adding the adjusted value, and driving the reaction motor 5.

In the block diagram of the direction varying control shown in FIG. 4, the SBW control process is maintained with a delay timer during a predetermined period of time from the beginning of the end contact control, and then the SBW control is switched into the EPS control. In the block diagram of the reaction control shown in FIG. 5, by turning on a second switch SW2 (end contact control flag=1), the end contact reaction-torque correction value is added. By turning on a third switch SW3 (clutch coupling completion flag=1), an inertia torque is added.

Figure 6:
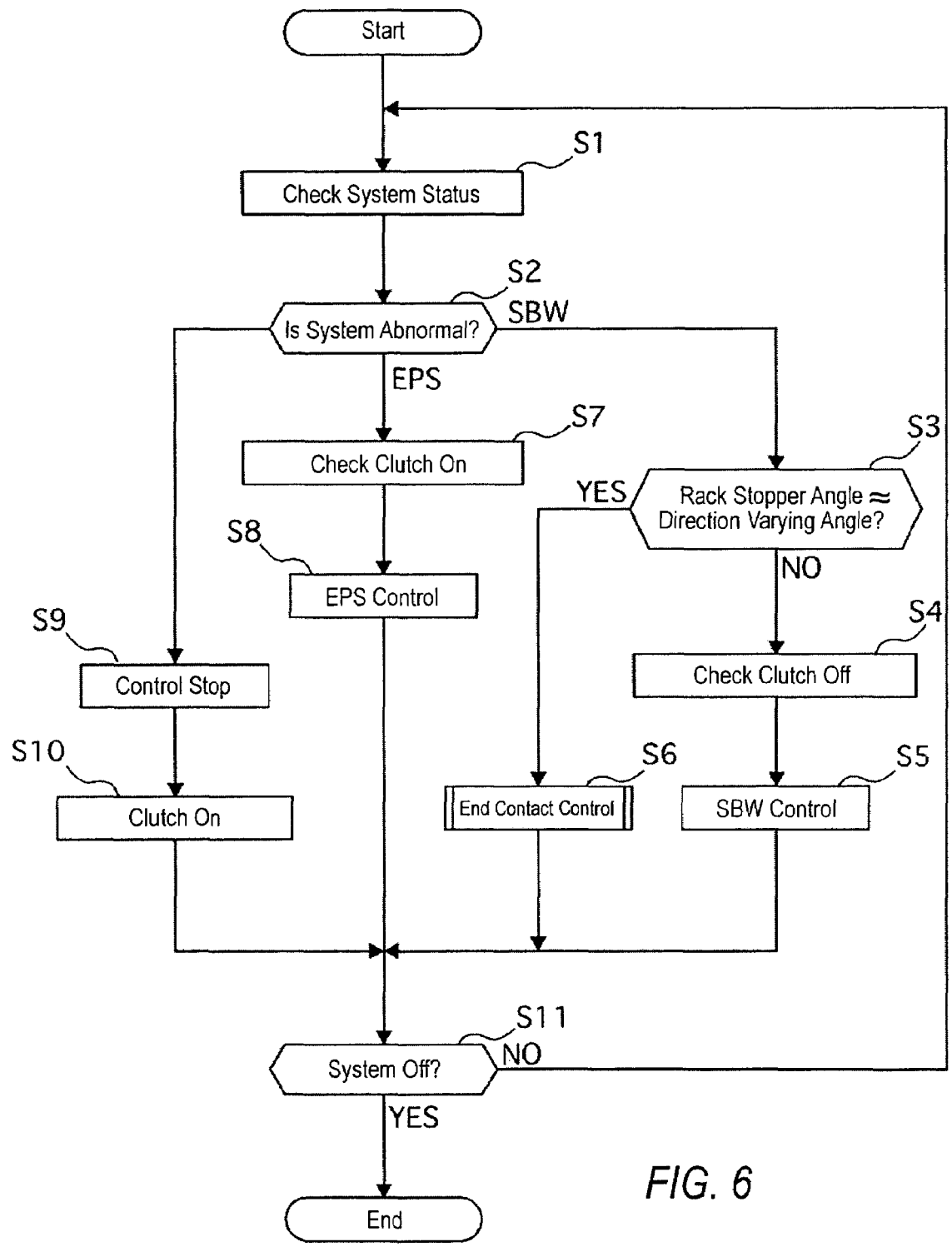
FIG. 6 is a flowchart illustrating control processes executed by the steering controller according to the illustrated embodiment.

FIG. 6 is a flowchart illustrating the control process executed by the controllers 19,19 according to the illustrated embodiment, respective steps of which are described below. This process is performed with a predetermined control cycle (for example, 10 msec).

In step S1, the status of the steer-by-wire system is checked and then step S2 is performed.

In step S2, it is determined whether the steer-by-wire system is normal or abnormal. Step S3 is performed when the system is normal, step S7 is performed when the system is so abnormal as to maintain EPS control, and step S9 is performed when the system is so abnormal as not to maintain the EPS control.

In step S3, subsequently to the determination in step S2 that the system is normal, it is determined whether the target direction varying angle generated based on the steering angle reaches the vicinity of the rack stopper angle. When it is NO, step S4 is performed and when it is YES, step S6 is performed. In this determination, for example, when the target direction varying angle is in a range of angle slightly greater than the rack stopper angle, it is determined that the target direction varying angle reaches the vicinity of the rack stopper angle.

In step S4, subsequently to the determination in step S3 that the target direction varying angle does not reach the vicinity of the rack stopper angle, it is checked whether the backup clutch 9 is released from the coupling (OFF), and then step S5 is performed.

In step S5, subsequently to the clutch OFF check in step S4, the normal SBW control process is performed and then step S11 is performed.

In step S6, subsequently to the determination in step S3 that the target direction varying angle reaches the vicinity of the rack stopper angle, the end contact control process (the flowchart shown in FIG. 7) is performed and then step S11 is performed.

In step S7, subsequently to the determination in step S2 that the system is so abnormal as to maintain EPS control, it is checked whether the backup clutch 9 is coupled (ON) and then step S8 is performed.

In step S8, subsequently to the clutch ON check in step S7, the EPS control process is performed and then step S11 is performed.

In step S9, subsequently to the determination in step S2 that the system is so abnormal as not to maintain EPS control, the SBW control process or the EPS control process is halted and then step S10 is performed.

In step S10, subsequently to the stopping of control in step S9, the backup clutch 9 is coupled (ON) and then step S11 is performed.

In step S11, subsequently to step S5, or step S6, or step S8, or step S10, it is determined whether the steer-by-wire system is OFF (for example, ignition OFF). When it is NO, step S1 is performed again and when it is YES, all the process is ended.

Figure 7:
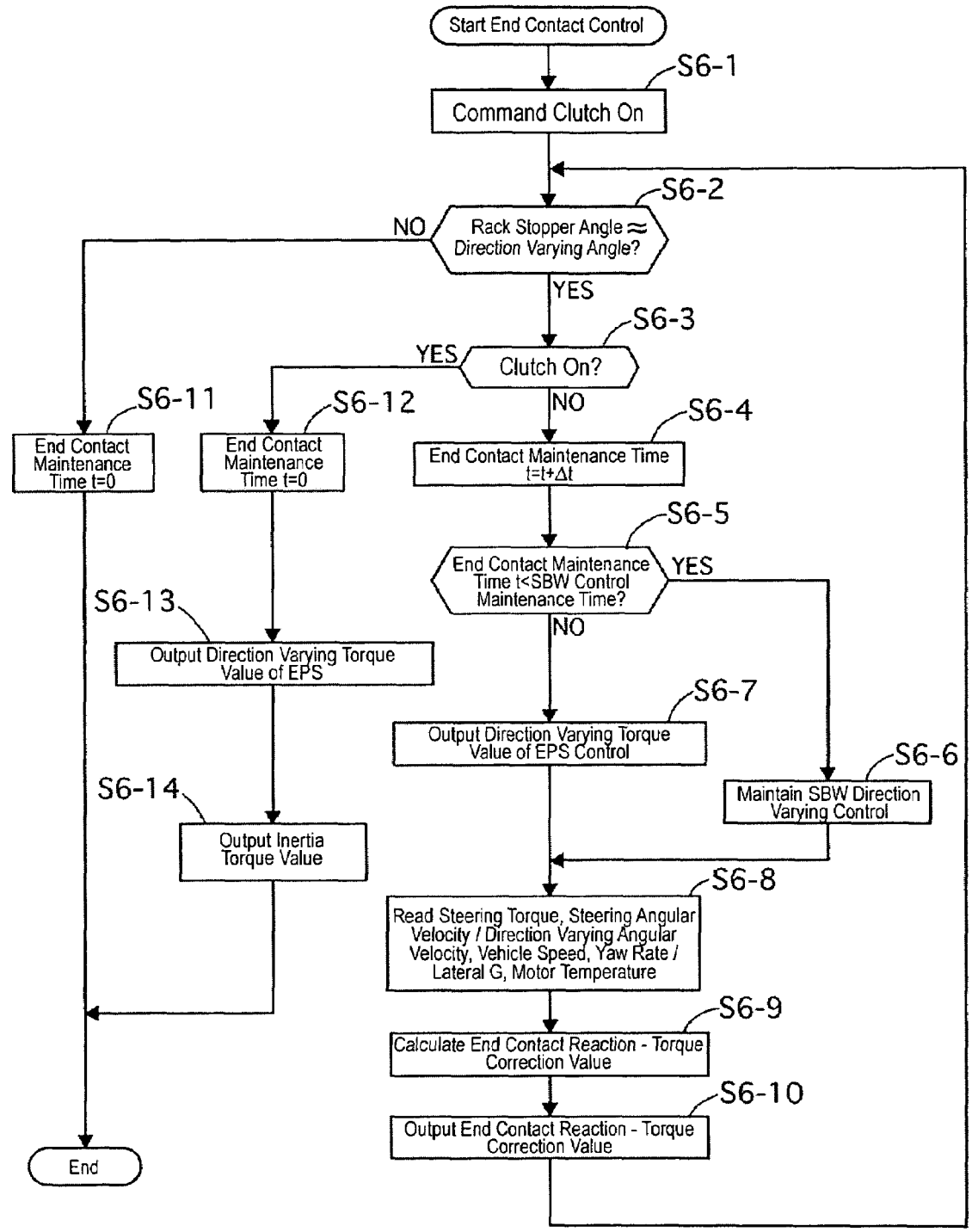
FIG. 7 is a flowchart illustrating an end contact control process executed by the steering controller according to the illustrated embodiment.

FIG. 7 is a flowchart illustrating the end contact control process (step S6 in FIG. 6) executed by the controllers 19,19 according to the illustrated embodiment, respective steps of which will be described below (end contact control means).

In step S6-1, a coupling (ON) command for the backup clutch 9 is output and step S6-2 is then performed.

In step S6-2, subsequently to the clutch ON command in step S6-1, it is determined whether the target direction varying angle generated based on the steering angle reaches the vicinity of the rack stopper angle. When it is YES, step S6-3 is performed and when it is NO, step S6-11 is performed. The details of the determination of whether the target direction varying angle reaches the vicinity of the rack stopper angle are similar to those of step S3 for the above-mentioned entire processes.

In step S6-3, subsequently to the determination in step S6-2 that the target direction varying angle reaches the vicinity of the rack stopper angle, it is determined whether the coupling of the backup clutch 9 is completed. When it is NO, step S6-4 is performed and when it is YES, step S6-12 is performed.

In step S6-4, subsequently to the determination in step S6-3 that the coupling of the backup clutch 9 is not completed, the end contact maintenance time t is counted (t=t+Δt, where Δt is a first control start time) and then step S6-5 is performed. That is, the end contact maintenance time t is counted from the time when the coupling command for the backup clutch 9 is output to the time when the coupling of the backup clutch 9 is completed.

In step S6-5, subsequently to the count-up of the end contact maintenance time in step S6-4, it is determined whether the end contact maintenance time t is less than the SBW control maintenance time. When it is YES, step S6-6 is performed and when it is NO, step S6-7 is performed.

Here, the SBW control maintenance time has the maximum maintenance time until the coupling completion time of the backup clutch 9. The SBW control maintenance time is set shorter as the steering angular velocity (which is calculated by differentiating the rudder angle from the rudder angle sensor 1 of the reaction unit) becomes greater, shorter as the steering torque (which is detected by the torque sensor 3 of the reaction unit) becomes greater, and longer as an external force (which is detected by the torque sensor 12 of the direction varying unit) input to the steered wheels 16,16 becomes greater.

In step S6-6, subsequently to the determination in step S6-5 that the end contact maintenance time t is less than the SBW control maintenance time, the SBW control is maintained in the direction varying control side and then step S6-8 is performed.

In step S6-7, subsequently to the determination in step S6-5 that the end contact maintenance time t is greater than or equal to the SBW control maintenance time, the SBW control is switched to the EPS control in the direction varying control side, the direction varying torque value in the EPS control is output, and then step S6-8 is performed.

In step S6-8, subsequently to step S6-6 or step S6-7, the steering torque, the steering angular velocity or the direction varying angular velocity, the vehicle speed, the yaw rate or the lateral G, and the motor temperature are read out and then step S6-9 is performed.

In step S6-9, subsequently to the read-out of the parameters indicating the vehicle statuses in steps S6-S8, the end contact reaction-torque correction value ΔT is calculated by the use of the following method using the end contact maintenance time t, the steering torque T, the steering angular velocity dθh/dt or the direction varying angular velocity dθt/dt, the yaw rate or the lateral G, the vehicle speed V, and the motor temperature Tmp, and then step S6-10 is performed.

Figure 8:
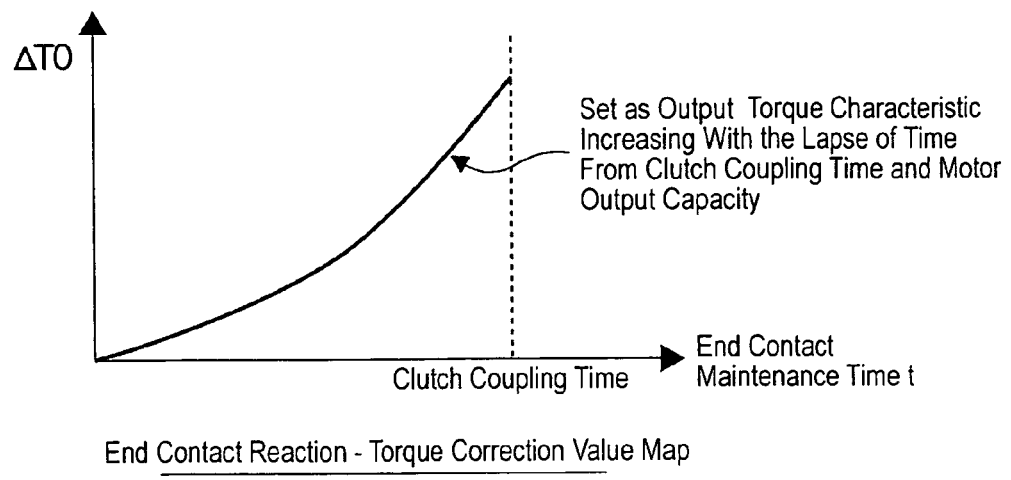
FIG. 8 is a graph of an end contact reaction-torque correction value used for the end contact control according to the illustrated embodiment.

The end contact reaction-torque correction reference value ΔT0 with respect to the end contact maintenance time t is obtained by comparing the end contact maintenance time t with a graph of end contact reaction-torque correction values shown in FIG. 8. The graph of end contact reaction-torque correction values establishes output torque characteristics increasing with the lapse of time from the clutch coupling time and the motor output capacity.

Figure 9:
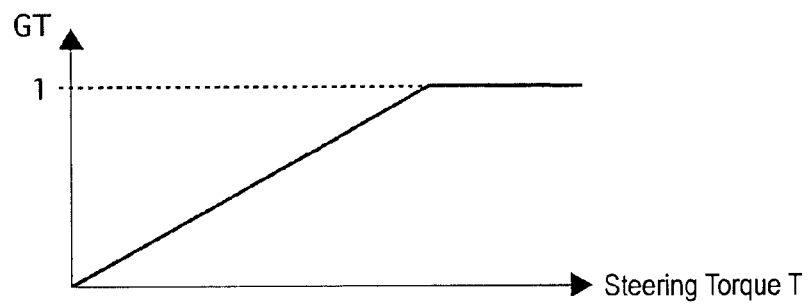
FIG. 9 is a graph of a steering torque gain of an end contact reaction-torque correction value used for the end contact control according to the illustrated embodiment.

As shown in FIG. 9, as the steering torque gain GT of the end contact reaction-torque correction value with respect to the steering torque T, a greater value is given as the steering torque T becomes greater when the steering torque T is less than a predetermined value and a constant value "1" is given when the steering torque T is greater than the predetermined value.

Figure 10:
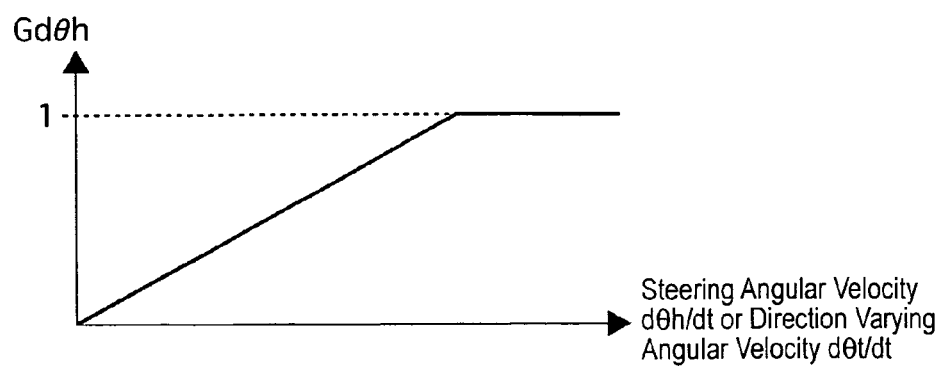
FIG. 10 is a graph of a rudder angular velocity gain of an end contact reaction-torque correction value used for the end contact control according to the illustrated embodiment.

As shown in FIG. 10, as the rudder angular velocity gain Gdθh of the end contact reaction-torque correction value with respect to the steering angular velocity dθh/dt or the direction varying angular velocity dθt/dt, a greater value is given as the steering angular velocity dθh/dt or the direction varying angular velocity dθt/dt becomes greater when the steering angular velocity dθh/dt or the direction varying angular velocity dθt/dt is less than or equal to a predetermined value and a constant value "1" is given when the steering angular velocity dθh/dt or the direction varying angular velocity dot/dt is greater than the predetermined value.

Figure 11:
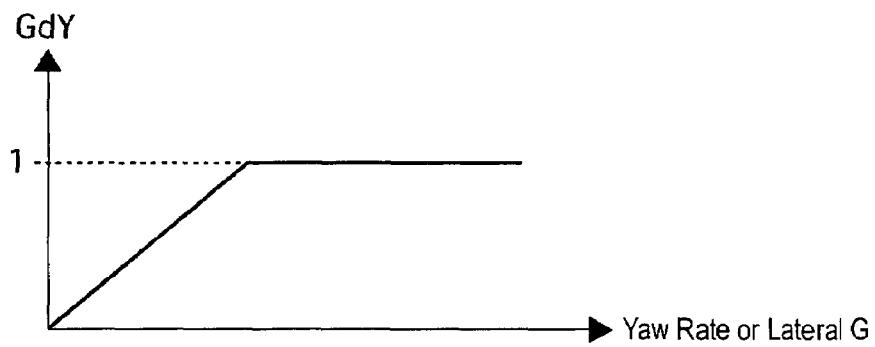
FIG. 11 is a graph of a vehicle behavior gain of an end contact reaction-torque correction value used for the end contact control according to the illustrated embodiment.

As shown in FIG. 11, as the vehicle behavior gain GdY of the end contact reaction-torque correction value with respect to the yaw rate or lateral G, a greater value is given as the yaw rate or lateral G becomes greater when the yaw rate or lateral G is less than or equal to a predetermined value and a constant value 1 is given when the yaw rate or lateral G is greater than the predetermined value.

Figure 12:
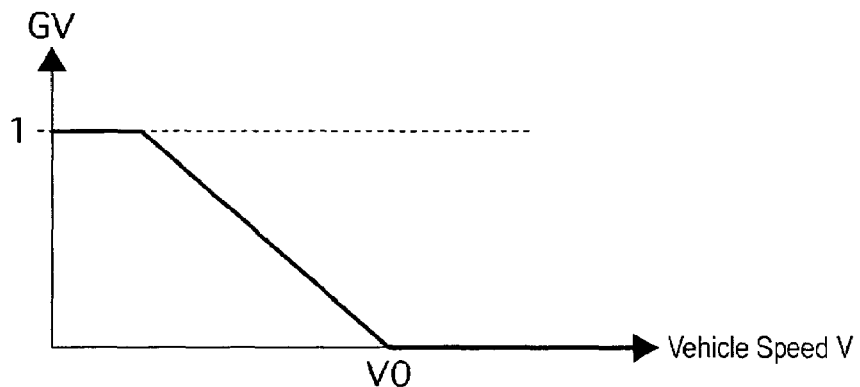
FIG. 12 is a graph of a vehicle speed gain of an end contact reaction-torque correction value used for the end contact control according to the illustrated embodiment.

As shown in FIG. 12, as the vehicle speed gain GV of the end contact reaction-torque correction value with respect to the vehicle speed V, a constant value "1" is given when the vehicle speed V is less than or equal to a predetermined vehicle speed and a smaller value is given as the vehicle speed V becomes greater when the vehicle speed V is greater than the predetermined vehicle speed. Then, when the vehicle speed is high (for example, V0=40 km/h or more), the vehicle speed gain GV is set to zero.

Figure 13:
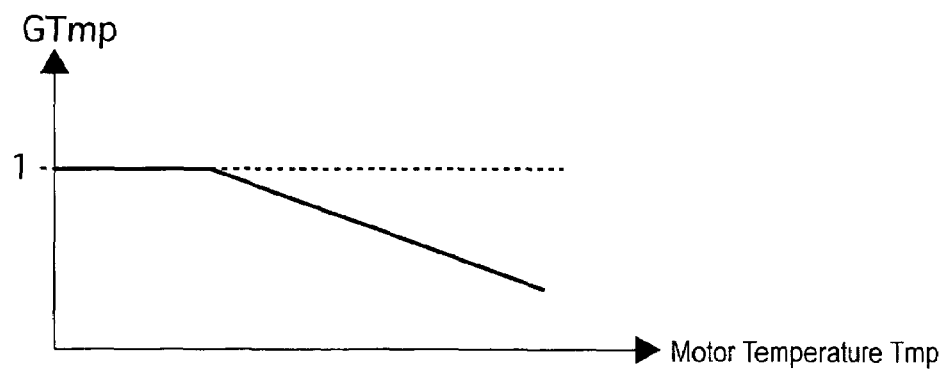
FIG. 13 is a graph of a motor temperature gain of an end contact reaction-torque correction value used for the end contact control according to the illustrated embodiment.

As shown in FIG. 13, as the motor temperature gain GTmp of the end contact reaction-torque correction value with respect to the motor temperature Tmp, a constant value "1" is given when the motor temperature Tmp is less than or equal to a predetermined temperature and a value gradually decreasing is given as the motor temperature Tmp becomes higher when the motor temperature Tmp is greater than the predetermined temperature.

By using the above-described values, the end contact reaction-torque correction value ΔT is calculated from the following expression.

$$\Delta T = \Delta T0 \times GT \times Gd\theta h \times GdY \times GV \times GTmp$$

In step S6-10, subsequently to the calculation of the end contact reaction-torque correction value in step S6-9, the end contact reaction-torque correction value ΔT is output and step S6-2 is performed again. That is, in the reaction control side, by adding the end contact reaction-torque correction value ΔT to the target reaction torque every control cycle, the reaction control for correcting the reaction torque to increase with the lapse of time is performed during the end contact maintenance time t.

In step S6-11, subsequently to the determination in step S6-2 that the target direction varying angle does not reach the vicinity of the rack stopper angle, the end contact maintenance time t is set t=0 and the processes are ended.

In step S6-12, subsequently to the determination in step S6-3 that the coupling of the backup clutch 9 is completed, the end contact maintenance time t is set t=0 and then step S6-13 is performed.

In step S6-13, subsequently to the setting of the end contact maintenance time t=0 in step S6-12, the output of the direction varying torque value of the EPS control is continued in the direction varying control side and then step S6-14 is performed.

In step S6-14, subsequently to the output of the direction varying torque value of the EPS control in step S6-13, an inertia torque value is output to the reaction motor 5 so as to leave the inertia torque of the backup clutch 9 in the reaction control side and then the process is ended.

When the system is normal, step S1, step S2, step S3, step S4, and step S5 in the flowchart shown in FIG. 6 are performed in that order. In step S4, the mechanical disconnection between the reaction unit and the direction varying unit due to the release of the coupling of the backup clutch 9 is checked. In step S5, the "SBW control" process of performing the direction varying torque control of outputting the control command for applying the direction varying torque to the direction varying unit in accordance with the steering status of the steering wheel 6 to the direction varying motor 14 and the steering reaction control of outputting the control command for applying the steering reaction torque to the reaction unit in accordance with the direction varying status of the steered wheels 16,16 to the reaction motor 5 is executed.

When turning manipulation of the steering wheel 6 is performed under "SBW control" and the target direction varying angle generated from the steering angle reaches the vicinity of the turning limit, that is, the vicinity of the rack stopper end contact angle, step S1, step S2, step S3, and step S6 in the flowchart shown in FIG. 6 are performed in that order. In step S6, the "end contact control" process of performing a control for applying the end contact feeling to the driver through the steering wheel 6 is executed.

Figure 14:
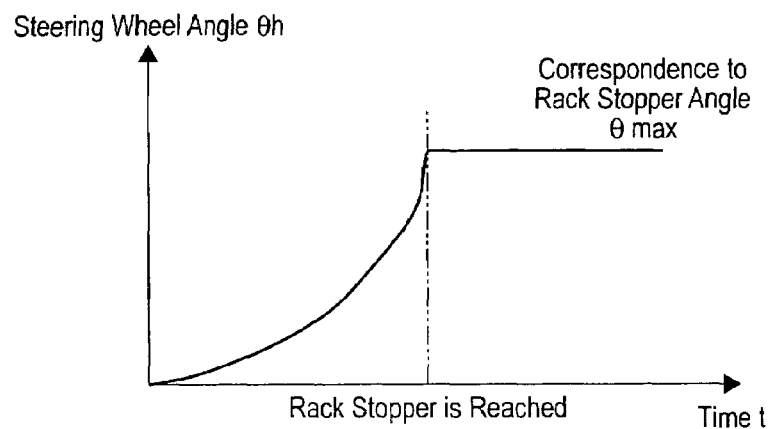
FIG. 14 is a timing diagram illustrating an example of variation in steering wheel angle at the time of end contact due to the turning of the steering wheel.

When the steering wheel is slowly turned, as shown in FIG. 14, in a general steering system in which the steering unit and the direction varying unit are always mechanically connected to each other through a steering column shaft or the like, the steering wheel angle reaches the limit at the rack stopper angle θmax due to reaching the rack stopper. The "end contact control" process means a control process of performing a function of informing the driver of the reaching of the rack stopper under the "SBW control" in the state that the steering unit and the direction varying unit are mechanically disconnected from each other.

In the "end contact control" process according to the illustrated embodiment, first, in step S6-1 of the flowchart shown in FIG. 7, the command for coupling the backup clutch 9 is output on the basis of the determination that the target direction varying angle generated from the steering angle reaches the vicinity of the rack stopper end contact angle.

Figure 15:
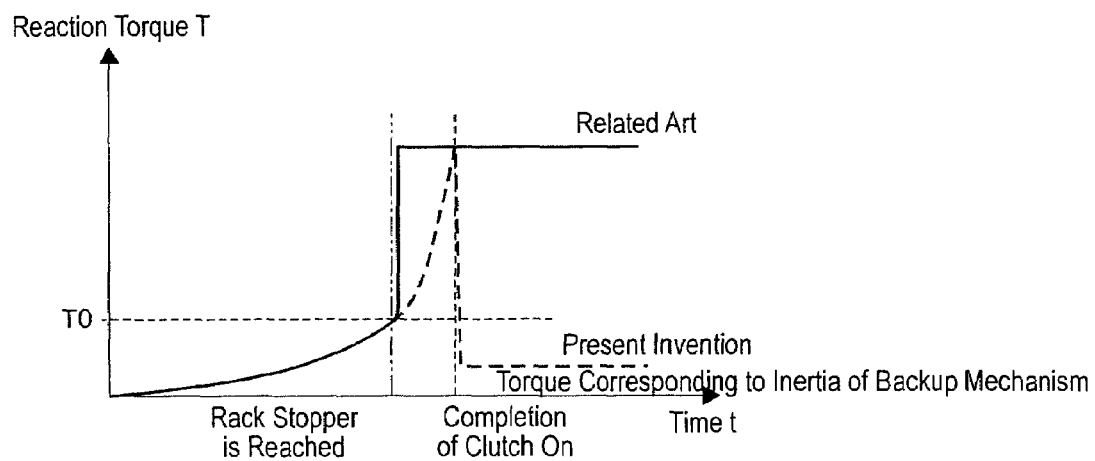
FIG. 15 is a graph in which a reaction torque characteristic according to a related art and a reaction torque characteristic according to the illustrated embodiment are compared with each other at the time of end contact due to the turning of the steering wheel.

Next, operation of the reaction control will be described. During the period of time from the output of the command for coupling the backup clutch 9 to the completion of the coupling, the flow of step 6-2, step S6-3, step S6-4, step S6-5, step S6-6 (or step S6-7), step S6-8, step S6-9, and step S6-10 in the flowchart shown in FIG. 7 is repeated in that order. In step S6-9, the end contact reaction-torque correction value ΔT which is added to the steering reaction torque is calculated. In step S6-10, the reaction control is performed by means of the output obtained by adding the end contact reaction-torque correction value ΔT to the obtained current. When the coupling completion of the backup clutch 9 is checked, a flow of step 6-2, step S6-3, step S6-12, step S6-13, step S6-14 and the end in the flowchart shown in FIG. 7 is performed in that order. In step S6-14, the control for leaving the torque corresponding to the inertia of the backup mechanism is performed (characteristic indicated by the dotted line in FIG. 15).

During the period of time from the output of the command for coupling the backup clutch 9 to the time when the end contact maintenance time t reaches the SBW control maintenance time, the flow of step 6-2, step S6-3, step S6-4, step S6-5, step S6-6, step S6-8, step S6-9, and step S6-10 in the flowchart shown in FIG. 7 is repeated in that order. In step S6-6, the direction varying torque of the SBW control is maintained during a predetermined period of time. Then, during the period of time from the time when the end contact maintenance time t is greater than the SBW control maintenance time to the time when the coupling of the backup clutch 9 is completed, the flow of step 6-2, step S6-3, step S6-4, step S6-5, step S6-7, step S6-8, step S6-9, and step S6-10 in the flowchart shown in FIG. 7 is repeated in that order. In step S6-7, the assist torque in the EPS control is given. When the coupling completion of the backup clutch 9 is checked, the flow of step 6-2, step S6-3, step S6-12, step S6-13, step S6-14 and the end in the flowchart shown in FIG. 7 is performed in that order. In step S6-13, the control for giving the assist torque in the EPS control is continued.

When the driver performs the manipulation of returning the steering wheel under the "end contact control" and it is thus determined that the target direction varying angle does not reach the vicinity of the rack stopper angle, step S6-2, step S6-11, and the end in the flowchart shown in FIG. 7 are performed in that order and then step S6, step S11, step S1, step S2, step S3, step S4, and step S5 in the process shown in FIG. 6 are performed in that order. Accordingly, the "end contact control" is switched again to the "SBW control".

Figure 16:
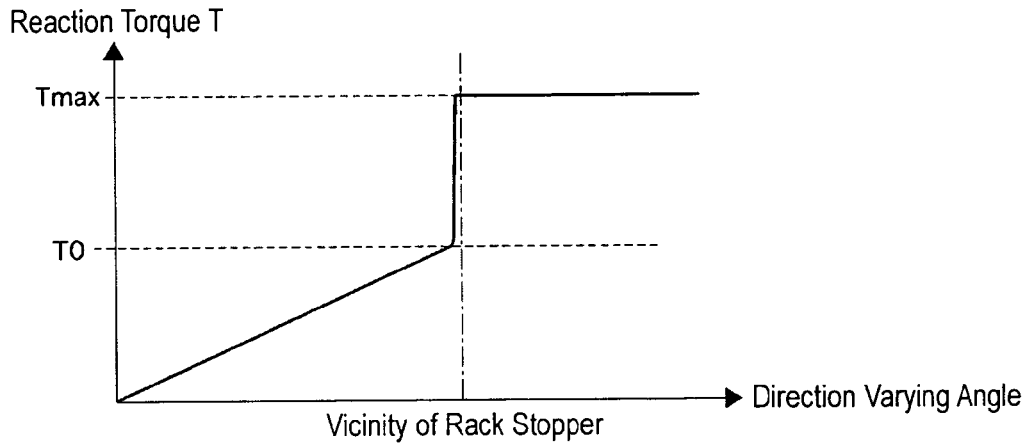
FIG. 16 is a graph of an end contact reaction torque with respect to the direction varying angle according to a related art.

The "end contact control" in the conventional SBW control was performed as follows. For example, as shown in FIG. 16, when the direction varying angle reaches the vicinity of the rack stopper angle, a control of changing the target reaction torque from the reaction torque T0 in the general SBW control to the maximum reaction torque Tmax was performed and as indicated by the solid line in FIG. 15, the reaction torque T was increased to the level at which the driver could not turn the steering wheel, right after the rack stopper has been reached. Accordingly, in order to generate the torque not permitting the turning as the reaction force, a large-sized reaction actuator was required. Further, since it was not the mechanical end contact feeling, there was a problem that the steering wheel could be turned when the driver intentionally applied a greater turning force.

Figure 17:
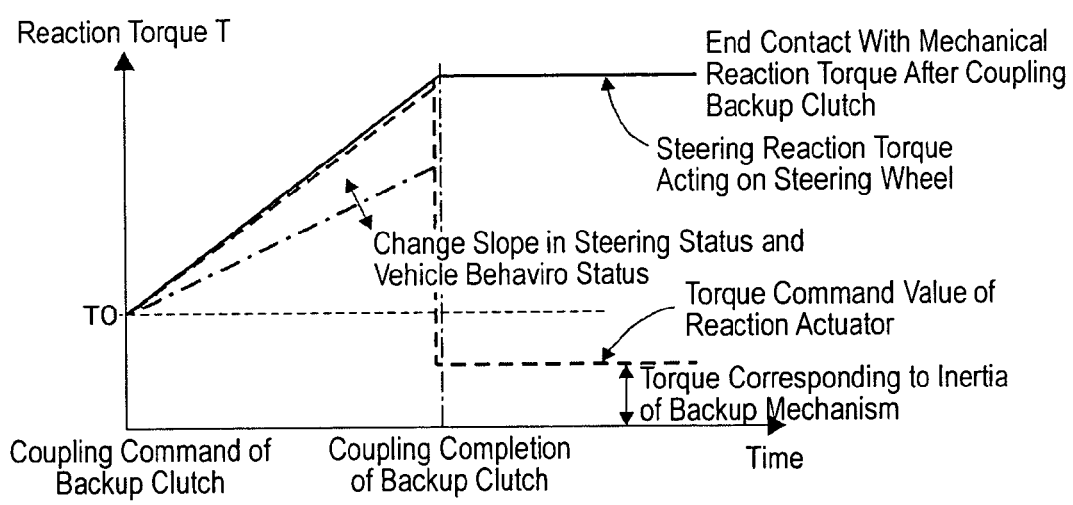
FIG. 17 is a graph of an end contact reaction torque characteristic with respect to a time axis and a steering reaction torque characteristic acting on the steering wheel at the time of turning the steering wheel according to the illustrated embodiment.

On the contrary, in the steering controller according to the illustrated embodiment, the command for coupling the backup clutch 9 is output on the basis of the determination that the target direction varying angle generated from the steering angle reaches the vicinity of the rack stopper end contact angle, the end contact reaction-torque correction reference value $\Delta T0$, which is added to the steering reaction torque T0 in accordance with the direction varying status, is calculated in accordance with the maintenance time t after the rack stopper end contact angle is reached, as indicated by the dotted line or the one-dot chained line of FIG. 17, during the period of time from the coupling command of the backup clutch 9 to the coupling completion, the gain thereof is adjusted in accordance with the traveling statuses (steering torque, steering angular velocity or direction varying angular velocity, vehicle behavior quantity, vehicle speed, reaction motor temperature, and the like) to calculate the end contact reaction-torque correction value $\Delta T$, and then the "end contact control" is performed by driving the reaction motor 5 by the use of the output obtained by adding the current value obtained from the end contact reaction-torque correction value $\Delta T$ to the steering reaction torque T0.

That is, the backup clutch 9 for coupling the backup mechanism has a mechanical and electrical specific time constant until the coupling of the input and output axes and a predetermined time determined from the specific time constant is required from the coupling command to the coupling completion. Therefore, during the period of time from the coupling command for the backup clutch 9 to the coupling completion, the "end contact control" is performed, the end contact reaction torque is given by the use of the reaction motor 5 which is the steering reaction actuator as shown in the characteristic indicated by the solid line of FIG. 17, the mechanical steering reaction force of the rack stopper generated after the coupling of the backup clutch 9 is subsequent thereto.

For example, since the steering reaction torque necessary for the normal traveling is 5 Nm and the output of the reaction motor can become double the normal torque for a short time, the motor torque can be increased to 5 Nm+α in accordance with the maintenance time in the vicinity of the end contact.

Therefore, in the "end contact control" according to the illustrated embodiment, since the reaction force gradually increasing can resist against the manipulation force for turning the steering wheel applied by the driver, the end contact feeling changed from the feeling that the turning of the steering wheel is reduced with the lapse of time to the feeling from the mechanical reaction torque can be provided to the driver. As a result, at the time of turning the steering wheel under the steer-by-wire control, it is possible to give an excellent end contact feeling to the driver through the steering wheel by the use of the small-sized reaction motor 5, which is advantageous in space and cost.

As described above, when the "end contact control" using the reaction control and the coupling control of the backup clutch 9 is performed and the coupling of the backup clutch 9 is completed, the mechanical end contact is ensured. Accordingly, it is possible to set the output to the reaction motor 5 and the output to the direction varying motor 14 to zero. However, when the outputs of the reaction motor 5 and the direction varying motor 14 are set to zero after the coupling of the backup clutch 9 is completed, the responses of the reaction motor 5 and the direction varying motor 14 are slowed when the "end contact control" is changed again to the "SBW control". Accordingly, the turning or the returning of the steering wheel not intended by the driver may occur.

On the contrary, in the steering controller according to the illustrated embodiment, when the coupling completion of the backup clutch 9 is checked, the end contact may exist for a short time depending upon the traveling conditions. Accordingly, the control of leaving a torque for easily returning in the outputs of the reaction motor 5 and the direction varying motor 14 is performed.

Figure 18:
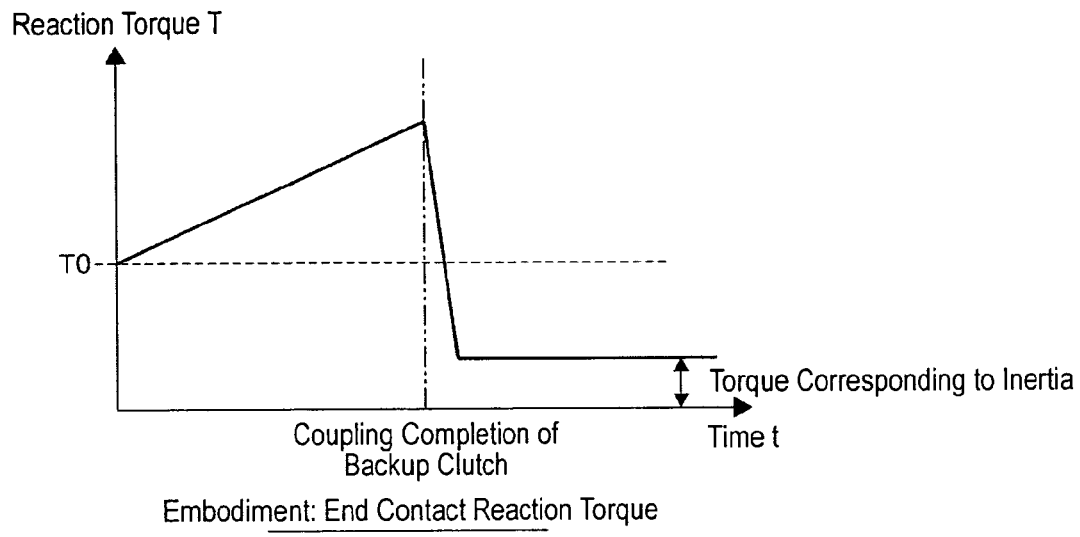
FIG. 18 is a graph of the reaction torque in the end contact control according to the illustrated embodiment.

In the reaction motor 5, as shown in FIG. 18, the reaction torque corresponding to the inertia of the steering wheel 6, the cable column 7, and the backup clutch 9 is generated (inertia torque). At the time of disconnection of backup, it is necessary to apply a torque so as to mechanically disconnect the backup clutch 9. Accordingly, by leaving the inertia torque in the reaction motor 5, it is possible to easily release the mechanical coupling. In addition, it is possible to rapidly increase the reaction motor 5.

Figure 19:
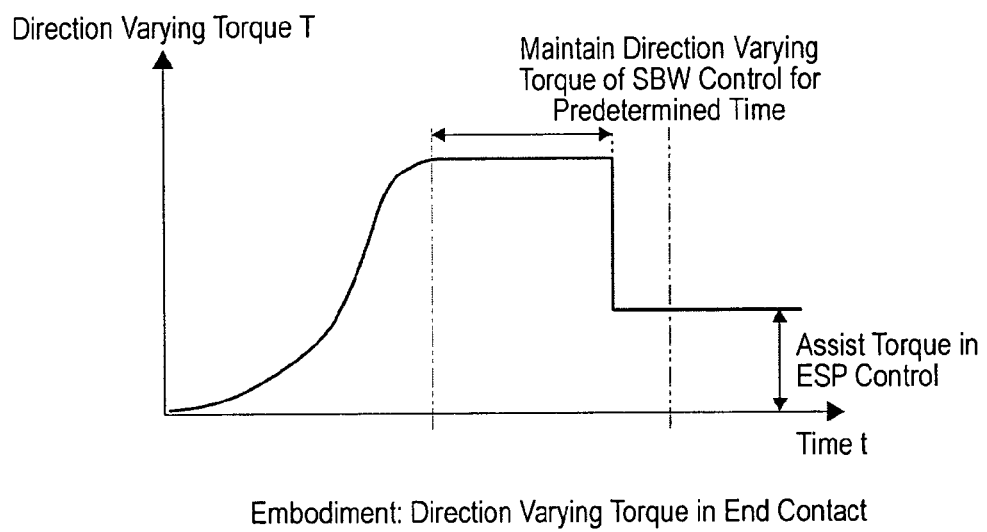
FIG. 19 is a graph of the steering torque in the end contact control according to the illustrated embodiment.

In the direction varying motor 14, as shown in FIG. 19, the assist torque by the EPS control is generated from the steering torque.

When the driver returns the steering wheel 6 right after the end contact control and thus the coupling of the backup clutch 9 is released, it is possible to reduce an uncomfortable steering feeling such as lack of the steering reaction force due to the delay of torque generation in the reaction motor 6 or delay in returning the direction varying due to the delay of torque generation in the direction varying motor 14, by leaving the torque in the reaction motor 5 and the direction varying motor 14.

In the steering controller according to the illustrated embodiment, the direction varying motor 14 maintains the SBW direction varying control for a predetermined time after the vicinity of the rack stopper end contact angle is reached, and then as shown in FIG. 19, generates the direction varying torque. In the illustrated embodiment, the predetermined time is set by delaying a switching signal by the use of a delay timer, but the present steering controller is not so limited.

The maximum value of the predetermined time is a time until the coupling of the backup clutch 9 is completed. The predetermined time is set shorter as the steering angular velocity becomes greater, shorter as the steering torque becomes greater, and longer as disturbance input to the steered wheels 16,16 becomes greater.

Accordingly, when the rack stopper end contact angle is reached and the driver returns the steering wheel 6 during the period of time until the coupling of the backup clutch 9 is completed, it is possible to suppress the variation in direction varying torque by allowing the SBW direction varying control to be maintained. In addition, when the driver turns the steering wheel 6 at that time, the direction varying torque can be reduced early, thereby reducing power consumption and suppressing the deterioration of the direction varying motor 14.

One or more of the following advantages can be obtained in the steering controller according to the illustrated embodiment.

(1) In the present steering controller, when a manipulation of turning the steering wheel 6 is performed in the steer-by-wire control process in which the steering unit and the direction varying unit are disconnected from each other and the vicinity of the turning limit is reached, the end contact control means begins the correction of the steering reaction torque applied by the steering reaction control means and gradually increases the steering reaction torque with the lapse of time after the beginning of correction, when the direction varying angle of the steered wheels 16,16 reaches the vicinity of the maximum direction varying angle. Accordingly, at the time of turning the steering wheel under the SBW control, it is possible to give an excellent end contact feeling to the driver through the steering wheel by the use of the small-sized steering reaction actuator advantageous in space and cost.

(2) The backup clutch 9 for permitting the mechanical connection and disconnection of the steering unit and the direction varying unit is disposed between both units and when the target direction varying angle generated from the steering angle reaches the vicinity of the rack stopper end contact angle, the end contact control means performs the backup control process of outputting the mechanical connection command to the backup clutch 9 and performs the steering reaction torque correcting control process of gradually increases the steering reaction torque with the lapse of time during the period of time from the mechanical connection command to the completion of the mechanical connection. Accordingly, it is possible to give an excellent end contact feeling to the driver, in which the steering reaction torque gradually increasing becomes the mechanical steering reaction force not permitting the turning of the steering wheel due to the coupling the backup clutch 9, by the use of the coupling response delay time of the backup clutch 9.

(3) The reaction unit torque sensor 3 for detecting the steering torque input to the steering unit is further provided, and the end contact control means increases the amount of enhancement correction of the steering reaction torque as the detected steering torque value becomes greater. Accordingly, it is possible to obtain the end contact reaction force corresponding to the steering torque such that the end contact reaction force is smaller as the steering torque becomes smaller and the end contact reaction force becomes greater as the steering torque becomes greater.

(4) The rudder angular velocity detecting means for detecting the steering angular velocity $d\theta h/dt$ of the steering unit or the direction varying angular velocity $d\theta t/dt$ of the direction varying unit is further provided, and the end contact control means increases the amount of enhancement correction of the steering reaction torque as the detected rudder angular velocity value becomes greater. Accordingly, it is possible to obtain the end contact reaction force corresponding to the steering angular velocity or the direction varying angular velocity such that the end contact reaction force is smaller as the steering angular velocity or the direction varying angular velocity becomes smaller and the end contact reaction force becomes greater as the steering angular velocity or the direction varying angular velocity becomes greater.

(5) The yaw rate/lateral G sensor 21 for detecting the vehicle behavior quantity is further provided, and the end contact control means increases the amount of enhancement correction of the steering reaction torque as the detected vehicle behavior quantity becomes greater. Accordingly, as the vehicle behavior becomes more unstable at the time of the end contact control, the steering reaction force becomes greater so as not to move the steered wheels 16,16, thereby stabilizing the vehicle behavior.

(6) The vehicle speed sensor 22 for detecting the vehicle speed is further provided, and the end contact control means decreases the amount of enhancement correction of the steering reaction torque as the detected vehicle speed value becomes greater. Accordingly, it is possible to cope with the mechanical reaction force in the vicinity of the rack stopper angle in which the self-aligning torque acting on the steered wheels 16,16 becomes smaller as the vehicle speed becomes greater.

(7) The reaction motor temperature sensor 23 for detecting the temperature of the reaction motor 5 is further provided, and the end contact control means decreases the amount of enhancement correction of the steering reaction torque as the detected temperature value of the reaction motor becomes greater. Accordingly, it is possible to prevent the disorder of the reaction motor 5 due to over-heating.

(8) The steering reaction torque control means reduces the steering reaction torque in comparison with the end contact control process and leaves a predetermined torque after the mechanical connection is completed by the backup clutch 9. Accordingly, when the backup clutch 9 is disconnected to return the "end contact control" to the "SBW control", it is possible to reduce the uncomfortable steering feeling such as the lack of steering reaction force.

(9) The steering reaction torque control means leaves the steering reaction torque corresponding to inertia of the steering unit after the mechanical connection is completed by the backup clutch 9. Accordingly, when the backup clutch 9 is disconnected to return the "end contact control" to the "SBW control", it is possible to prevent the lack of the steering reaction force by means of generation of the torque in the reaction motor 5 having an excellent response property.

(10) The direction varying torque control means reduces a direction varying torque in comparison with the end contact control process and leaves a predetermined torque after the mechanical connection is completed by the backup clutch 9. Accordingly, when the backup clutch 9 is disconnected to return the "end contact control" to the "SBW control", it is possible to reduce the uncomfortable steering feeling such as the direction varying delay of the returning.

(11) The reaction unit torque sensor 3 for detecting the steering torque input to the steering unit is further provided, and the direction varying torque control means leaves the assist torque of the EPS control in accordance with the detected steering torque value after the mechanical connection is completed by the backup clutch 9. Accordingly, it is possible to prevent the direction varying delay of the returning by means of generation of the torque in the direction varying motor 14 having an excellent response property, while ensuring the smooth switching from the "SBW control" to the "EPS control".

(12) The direction varying control means maintains the direction varying torque of the SBW control, during a predetermined period of time of which the maximum period of time is from the time when the mechanical connection command is output to the backup clutch 9 to the time when the mechanical connection is completed by the backup clutch 9. Accordingly, during the period of time until the coupling of the backup clutch 9 is completed, it is possible to accomplish both of the suppression of the variation in direction varying torque when the driver returns the steering wheel 6 and the reduction in power consumption when the driver turns the steering wheel 6 as it is.

Hitherto, the present steering controller has been described with reference to the illustrated embodiment, but the specific configuration thereof is not limited to the illustrated embodiment. That is, variation in design or addition of elements can be permitted without departing from the scope of the appended claims.

In the illustrated embodiment, it has been exemplified that the end contact control means outputs the coupling command of the backup clutch on the basis of the determination that the target direction varying angle generated from the steering angle reaches the vicinity of the rack stopper end contact angle and performs the steering reaction torque correction control for gradually increasing the steering reaction torque with the lapse of time during the period of time from the coupling command of the backup clutch to the coupling completion. However, only the enhancement correction control of the steering reaction torque may be performed without performing the coupling of the backup clutch and the start time of the enhancement correction control of the steering reaction torque may be determined based on the actual direction varying angle instead of the target direction varying angle. In brief, it is included in the scope of the present steering controller that when the direction varying angle of the steered wheels reaches the vicinity of the maximum direction varying angle, the correction of the steering reaction torque applied by the steering reaction control means is started and the steering reaction torque is gradually increased.

Although it has been exemplified in the illustrated embodiment that the gain is adjusted based on the steering torque, the steering angular velocity or the direction varying angular velocity, the vehicle behavior quantity, the vehicle speed, the reaction motor temperature and the end contact reaction-torque correction value is calculated, the end contact reaction-torque correction value may be calculated based on status quantities other than those described in the illustrated embodiment. Alternatively, the end contact reaction-torque correction value may be set univocally on the basis of only a predetermined characteristic (FIG. 8) of the maintenance time, without performing the adjustment of the gain.

In the illustrated embodiment, it has been exemplified that the steering reaction torque corresponding to the inertia of the steering unit and the direction varying torque corresponding to the assist torque of the EPS control are left after the mechanical connection by the backup clutch is completed. However, the torque to be left is not limited to the torque corresponding to the inertia or the torque corresponding to the assist torque. In brief, a predetermined torque can be included in the scope of the present steering controller only if it is a torque capable of securing the response property for the generation of torque when the "end contact control" is returned to the "SBW control". One of the steering reaction torque and the direction varying torque may be left.

Although an example of the steering controller which applies to the steer-by-wire system employing the cable column and the backup clutch as the backup means has been described in the illustrated embodiment, the steering controller may apply to any steer-by-wire system other than the illustrated embodiment, only if the system has backup means for mechanically connecting and disconnecting the steering unit and the direction varying unit to and from each other.

Thus, while the present steering control has been described in connection with a specific embodiment thereof, this is by way of illustration and not of limitation, and the appended claims should be construed as broadly as the prior art will permit.

What is claimed is:

1. A steering control apparatus, comprising:
a steering wheel;
steered wheels mechanically disconnected from the steering wheel;
a direction varying actuator to operate the steered wheels;
a steering reaction actuator to apply steering reaction torque to the steering wheel;
a steering controller configured to output a control command to the direction varying actuator for applying a direction varying torque to the steered wheels in accordance with the steering status of the steering wheel; and
a backup mechanism disposed between the steering wheel and the steered wheels to permit mechanical connection and disconnection of the steering wheel and the steered wheels; wherein
the steering controller is configured to output a control command to the steering reaction actuator for applying a steering reaction torque to the steering wheel in accordance with the direction varying status of the steered wheels;
the steering controller is configured to gradually increase the steering reaction torque with the lapse of time when the direction varying angle of the steered wheels reaches the vicinity of the maximum direction varying angle; and
the steering controller is configured to, when a target direction varying angle generated from a steering angle reaches the vicinity of the maximum direction varying angle of the steered wheels, selectively perform a backup control process of outputting a mechanical connection command to the backup mechanism and selectively perform a steering reaction torque correcting control process of gradually increasing the steering reaction torque with the lapse of time during a period of time from the mechanical connection command to completion of the mechanical connection.

2. The steering control apparatus according to claim 1, wherein the steering controller is configured to selectively reduce the steering reaction torque and to selectively leave a predetermined torque after the mechanical connection is completed by the backup mechanism.

3. The steering control apparatus according to claim 2, wherein the steering controller is configured to selectively leave the steering reaction torque corresponding to inertia of the steering wheel after the mechanical connection is completed by the backup mechanism.

4. The steering control apparatus according to claim 1, wherein the steering controller is configured to selectively reduce the direction varying torque and to selectively leave a predetermined torque after the mechanical connection is completed by the backup mechanism.

5. The steering control apparatus according to claim 4, further comprising:
- a steering torque sensor for detecting a steering torque input to the steering wheel; and
- wherein the steering controller is configured to selectively leave an assist torque of a steering assist control process in accordance with the detected steering torque value after the mechanical connection is completed by the backup mechanism.

6. The steering control apparatus according to claim 1, wherein the steering controller is configured to selectively maintain the direction varying torque of a steer-by-wire control process during a predetermined period of time of which a maximum period of time is from the time when the mechanical connection command is output to the backup mechanism to the time when the mechanical connection is completed by the backup mechanism.

7. The steering control apparatus according to claim 1, further comprising:
- a steering torque sensor for detecting a steering torque input to the steering wheel; and
- wherein the steering controller is configured to selectively increase an amount of enhancement correction of the steering reaction torque as the detected steering torque value becomes greater.

8. The steering control apparatus according to claim 1, further comprising:
- a rudder angular velocity sensor for detecting a steering angular velocity of the steering wheel or a direction varying angular velocity of the steered wheels; and
- wherein the steering controller is configured to selectively increase an amount of enhancement correction of the steering reaction torque as the detected steering angular velocity value becomes greater.

9. The steering control apparatus according to claim 1, further comprising:
- a vehicle behavior sensor for detecting an amount of vehicle behavior; and
- wherein the steering controller is configured to selectively increase an amount of enhancement correction of the steering reaction torque as the detected vehicle behavior value becomes greater.

10. The steering control apparatus according to claim 1, further comprising:
- a vehicle speed sensor for detecting vehicle speed; and
- wherein the steering controller is configured to selectively decrease an amount of enhancement correction of the steering reaction torque as the detected vehicle speed value becomes greater.

11. The steering control apparatus according to claim 1, further comprising:
- a temperature sensor for detecting a temperature of the steering reaction actuator; and
- wherein the steering controller is configured to selectively decrease an amount of enhancement correction of the steering reaction torque as the detected temperature value of the steering reaction actuator becomes greater.

12. A steering control apparatus, comprising:
- a steering wheel;
- at least one steered wheel mechanically disconnected from the steering wheel;
- a direction varying actuator to operate the at least one steered wheel;
- a steering reaction actuator to apply steering reaction torque to the steering wheel;
- a backup mechanism disposed between the steering wheel and the at least one steered wheel to permit mechanical connection and disconnection of the steering wheel and the at least one steered wheel;
- an angular velocity sensor for detecting one of a steering angular velocity of the steering wheel and a direction varying angular velocity of the at least one steered wheel; and
- a steering controller configured to output a control command to the direction varying actuator for applying a direction varying torque to the steered wheels in accordance with a steering status of the steering wheel,
- to output a control command to the steering reaction actuator for applying a steering reaction torque to the steering wheel in accordance with the direction varying status of the at least one steered wheel;
- to selectively increase an amount of enhancement correction of the steering reaction torque as the detected angular velocity value becomes greater; and
- to, when a target direction varying angle generated from a steering angle reaches the vicinity of the maximum direction varying angle of the steered wheels, selectively perform a backup control process of outputting a mechanical connection command to the backup mechanism and selectively perform a steering reaction torque correcting control process of gradually increasing the steering reaction torque with the lapse of time during a period of time from the mechanical connection command to completion of the mechanical connection.

13. The steering control apparatus according to claim 12 wherein the steering controller is configured to selectively reduce the steering reaction torque and to selectively leave a predetermined torque after the mechanical connection is completed by the backup mechanism.

14. The steering control apparatus according to claim 12 wherein the steering controller is configured to selectively reduce the direction varying torque and to selectively leave a predetermined torque after the mechanical connection is completed by the backup mechanism.

15. The steering control apparatus according to claim 14, further comprising:
- a steering torque sensor for detecting a steering torque input to the steering wheel; and
- wherein the steering controller is configured to selectively leave an assist torque of a steering assist control process in accordance with the detected steering torque value after the mechanical connection is completed by the backup mechanism.

16. The steering control apparatus according to claim 12 wherein the steering controller is configured to selectively maintain the direction varying torque of a steer-by-wire control process during a predetermined period of time of which a maximum period of time is from the time when the mechanical connection command is output to the backup mechanism to the time when the mechanical connection is completed by the backup mechanism.

17. The steering control apparatus according to claim 12, further comprising:
- a steering torque sensor for detecting a steering torque input to the steering wheel; and
- wherein the steering controller is configured to selectively increase the amount of enhancement correction of the steering reaction torque as the detected steering torque value becomes greater.

18. The steering control apparatus according to claim 12, further comprising:
- a vehicle behavior sensor for detecting an amount of vehicle behavior; and wherein the steering controller is configured to selectively increase the amount of enhancement correction of the steering reaction torque as the detected vehicle behavior value becomes greater.

19. The steering control apparatus according to claim 12, further comprising:
a vehicle speed sensor for detecting vehicle speed; and
wherein the steering controller is configured to selectively decrease the amount of enhancement correction of the steering reaction torque as the detected vehicle speed value becomes greater.

20. The steering control apparatus according to claim 12, further comprising:
a temperature sensor for detecting a temperature of the steering reaction actuator; and
wherein the steering controller is configured to selectively decrease the amount of enhancement correction of the steering reaction torque as the detected temperature value of the steering reaction actuator becomes greater.

* * * * *